Jan. 1, 1957  H. J. MODREY  2,776,385
CONNECTING CORD FOR USE IN CONNECTION WITH AN
ELECTRIC POWER UNIT
Filed May 28, 1953
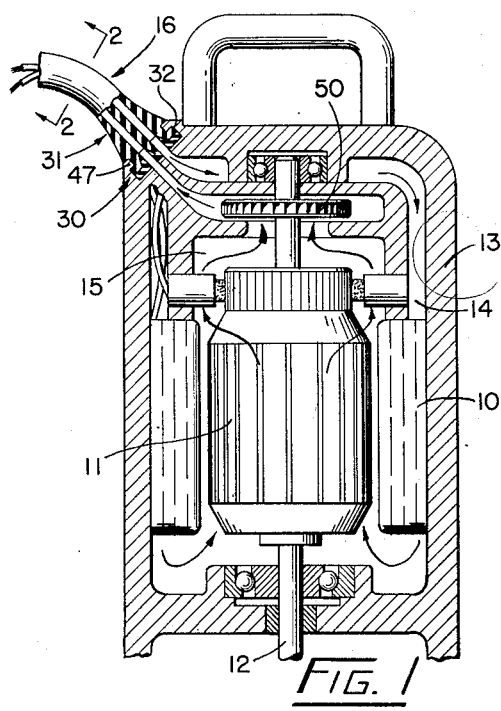
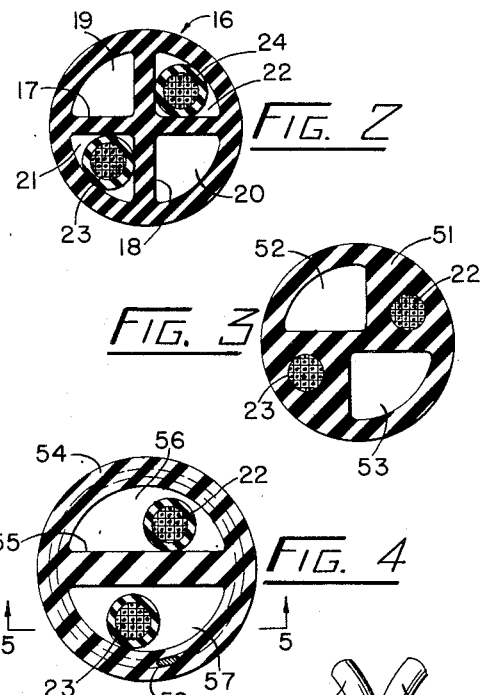
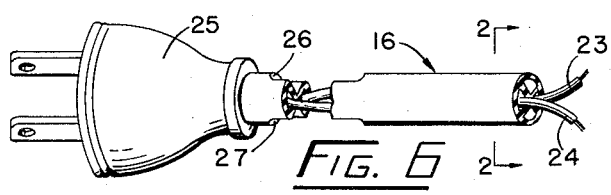
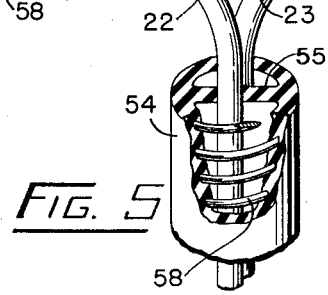
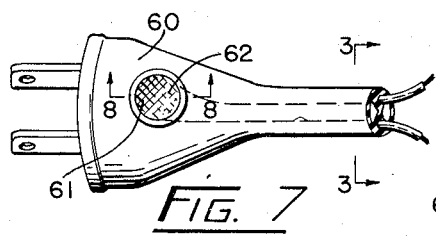
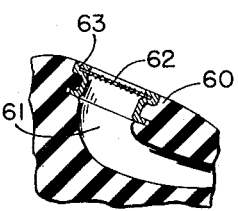
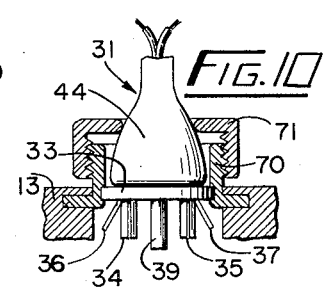
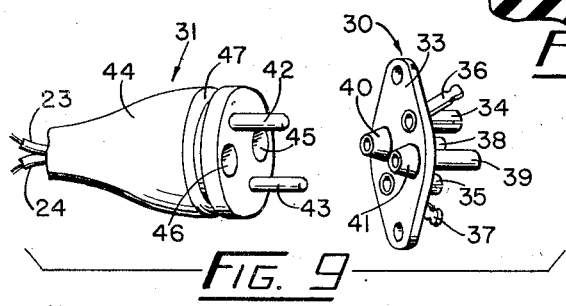
INVENTOR.
HENRY J. MODREY
BY Frederick G. Hauy
ATTORNEY

United States Patent Office 2,776,385
Patented Jan. 1, 1957

2,776,385

CONNECTING CORD FOR USE IN CONNECTION WITH AN ELECTRIC POWER UNIT

Henry J. Modrey, Stamford, Conn., assignor to AMI Incorporated, Grand Rapids, Mich., a corporation of Delaware Application May 28, 1953, Serial No. 358,025

14 Claims. (Cl. 310—71)

The present invention relates to connecting cords for electric power units, and particularly to connecting cords for power units including a driving means such as an electric motor, requiring cooling or ventilating during operation.

Power units of the general type above referred to, are used in various technical devices and appliances, in particular in power tools, both portable and stationary, such as power drills, saws, household appliances such as electric hand mixers and portable washing machines. They are also used in equipment employed in mines and medical operating theaters.

The aforementioned devices and appliances and many other devices and appliances require an installation of the motor in a housing to protect both the operator and the motor. Mounting of the motor in a housing creates the problem of cooling or ventilating the motor to dissipate the heat developed during the operation. While adequate cooling or ventilating can be maintained by providing ventilation slots directly in the motor housing, such an arrangement is frequently unsatisfactory as the devices of which the power unit forms part, for instance power drills, are often operated in an environment in which dust and metal particles are present in abundance, particularly during operation. Obviously, dust and metal particles will greatly reduce the useful life of the power unit if they penetrate into the same as they are bound to do when the ventilation slots are in the motor housing. Furthermore, with some fields of application for instance when the devices are used in mines or medical operating theaters, the applicable safety codes demand totally enclosed and explosion-proof motors as any sparks emanating from the motor and escaping through the ventilation slots would be highly dangerous. Totally enclosed and explosion-proof motors which are adequately ventilated, as hitherto known, are expensive and bulky.

Another problem arises when the power unit is used in a moist atmosphere or may be subjected to immersion in liquid as is true for instance with a portable household washing machine or hand mixer which must operate in a moist atmosphere and may accidentally be immersed in water. Under operational conditions of this nature, ventilation slots are obviously not a satisfactory answer to the problem of maintaining adequate ventilation.

The principal object of the present invention is to provide novel and improved ventilating and electrical connecting means for power units of the general type above referred to, which afford all the essential advantages of a completely closed explosion- and moisture-proof motor housing without entailing the disadvantages of installations of this type as hitherto known.

Another object of the invention is to provide novel and improved ventilating and electrical connecting means which permits the use of a standard inexpensive motor housing, completely to close the same and yet to maintain adequate ventilation.

Still another object of the invention is to provide a novel and improved ventilating arrangement in which the inlet and outlet ports for the cooling medium such as air, which ports constitute the only communication of the otherwise sealed motor housing with the atmosphere, are well spaced from the motor housing by forming the said ports in ducts communicating with the interior of the motor housing by means of sealed joints. This affords the advantages that the ports can be located in an environment which is reasonably free of dust and metal particles and that any spark produced by the motor or other electric components disposed within the housing will be quenched long before it can reach the ports thereby making the motor explosion-proof. Similarly, the power unit can be easily protected against moisture and the danger of immersion by appropriately locating said ports. If desired or necessary, filters or screens may be placed in front of the ports.

Other and further objects, features and advantages of the invention will be pointed out hereinafter and set forth in the appended claims forming part of the application.

In the accompanying drawings several now preferred embodiments of the invention are shown by way of illustration and not by way of limitation.

In the drawings:

Fig. 1 is a sectional view of an electric power unit the motor of which is ventilated and connected by means of a connecting cord according to the invention.

Fig. 2 is a section taken on line 2—2 of Figs. 1 and 6 on an enlarged scale.

Fig. 3 is a sectional view similar to Fig. 2 taken on line 3—3 of Fig. 7.

Fig. 4 is a sectional view of another modification of the connecting cord.

Fig. 5 is an isometric view taken on line 5—5 of Fig. 4.

Fig. 6 is an isometric view of the plug end of the connecting cord of Fig. 1 and of the ventilating ports provided within the cord.

Fig. 7 is an isometric view of a modification of the plug end of the cord and the ports provided therein.

Fig. 8 is a fragmentary sectional view taken on line 8—8 of Fig. 7 on an enlarged scale.

Fig. 9 is an isometric view of the connector for sealing the cord of Fig. 1 to the motor housing, and Fig. 10 is a sectional view of a modification of the connector for sealing the respective end of the connector cord to the housing.

Referring first to Fig. 1 in detail, this figure shows an electric power unit which may be visualized as being used in any of the devices and appliances previously referred to or in similar devices. The power unit comprises as driving means a conventional electric motor having field windings 10 and a rotor 11 mounted on a shaft 12 coupled with the implement or tool to be driven by the motor. The motor is enclosed in a housing 13 which may either be a split housing or a single piece housing in form of a cylindrical casting. To ventilate all parts of the motor and any other components that may be disposed within the housing and to dissipate the heat developed by the motor, communicating ventilation channels or ducts 14 and 15 are formed within the housing. A cooling medium such as air is admitted into the interior of housing 13 and discharged therefrom by means of a tubular member in form of a flexible hose or tube generally designated by 16 which also serves to lead the electric connections for the motor into the housing so that hose 16 may be appropriately referred to as a connecting cord. The connecting cord which may have any desired length and which may be made of rubber, a rubber composition, plastic or other suitable flexible material is divided by partition walls 17 and 18 in four longitudinal channels as can be clearly seen in Fig. 2. Channels 19 and 20 serve as intake and exhaust duct respectively for the cooling air, the flow direction of which is indicated by arrows in Fig. 1. The two other channels 21 and 22 house the connecting wires 23 and 24 for the motor.

The outer end of the connecting cord ends in a connector member 25 shown as a plug of conventional design the pole elements of which are connected to wires 23 and 24. While a two-pole plug has been shown, it will be obvious that a three-pole plug can also be used in case a ground connection is required. At a point of the hose located well spaced from the motor housing, generally as shown near plug 25, apertures 26 and 27 are provided communicating with the ducts 19 and 20. These apertures serve as intake and exhaust ports respectively. The other end of the connecting cord leads into the interior of the motor housing, and is sealed to the motor housing by joining and sealing means which will be subsequently described.

Fig. 9 shows as joining and sealing means a connector which is particularly suitable for a split housing. This connector which is shown as being used for the power unit of Fig. 1, comprises a receiving member generally designated by 30 and an engaging member generally designated by 31. The receiving member is fitted in an annular recess 32 provided for this purpose in housing 13 before the two halves of the housing are joined so that it is tightly and safely held in position after joining the housing sections.

Member 30 comprises a base plate 33 preferably made of insulation material on which are mounted two receiving pole elements 34 and 35. The wires 23 and 24 are connected with these pole elements by means of tails 36 and 37 respectively or by any other suitable means. Plate 30 further supports two sleeves 38 and 39 forming conduits for the cooling air. These sleeves are continued on the outer side of plate 30, that is, on the side facing the engaging member of the connector by two conically shaped members 40 and 41. The cones 40 and 41 may be made of metal, plastic or rubber and may be molded integrally with base 33. While the provision of sleeves 38 and 39 is frequently advantageous, they may also be omitted in which case air is conducted directly through cones 40 and 41 into the interior of the housing. Finally, the components formed by or supported on base 33 may also be directly formed on the motor housing.

The engaging connector member 31 comprises two engaging pole elements 42 and 43 adapted to be fitted in the receiving pole elements 34 and 35. The generally conical body 44 of member 31 which is preferably integral with the hose proper has in its face end two cone shaped openings 45 and 46 communicating with ducts 19 and 20 respectively as can best be seen in Fig. 1. The outer wall of body 44 is formed with an annular groove 47 which is engaged by a collar 47 defining part of the wall of groove 32. As a result, the connector is tightly sealed to the housing when the two halves of the housing are joined. Cones 40 and 41 will be seated snugly in the receiving cones 45 and 46 when the engaging member 31 is applied to the receiving member 30 whereby a tightly sealed joint is established between ducts 19 and 20 and the ducts 14 and 15 formed within the motor housing.

The cooling air is forced through the motor housing by means of a motor fan 50 mounted on shaft 12. The air is sucked in through the inlet port 26 and discharged through the outlet port 27.

As is evident from the previous description, the motor housing is or may be entirely sealed. Its only necessary connection with the atmosphere is through ports 26 and 27. Any sparks that may be produced, for instance at the commutator of the motor, must travel along the entire length of ducts 19 or 20 before they can escape through ports 26 and 27 and are bound to be extinguished before they reach the ports. Dust and other discrete particles present in the vicinity of the power unit cannot enter the housing of the same. It will generally be possible to give hose 16 such a length that the ports therein are located in a reasonably dust-free environment. As an additional precautionary method, filters or screens may be placed over the ports.

The spacing of the ports from the housing also protects the interior of the housing from the ingress of moisture into the same. Furthermore, the separation of the ventilation ports from the housing prevents or at least makes nearly impossible the ingress of water into the housing. When for instance the motor is used to drive the impeller of a washing machine and the machine accidentally is submerged in the water it cannot flow into the ports as the same are bound to be far removed from the sink or other container in which the washing machine is used. The ports can be submerged in water only when the plug 25 is pulled out of its outlet. In the event of such an unlikely occurrence, the arrangement according to the invention still affords the important advantage that the current is disconnected. This results in a practically complete protection against electric shocks which is of particular importance for a home appliance which is used within water and the use of which necessitates that the arms of the operator are in water whereby the operator is highly susceptible to dangerous electric shocks.

Fig. 3 shows a connecting cord in form of a flexible hose 51 in which only two ducts 52 and 53 are formed. Wires 22 and 23 are embedded in solid portions of the partition walls forming the ducts. With such an arrangement, it is of course not necessary to encase the wires in insulation material. Ducts 52 and 53 again serve as intake and discharge ducts for the cooling air. The arrangement of Fig. 3 has the advantage that it protects the connecting cord better than the arrangement of Fig. 2 from flattening due to kinks or pressure which would or might result in an at least temporary interruption of the circulation of cooling air through the housing.

Figs. 4 and 5 show an arrangement in which a flexible hose 54 is divided by a partition wall 55 in two ducts 56 and 57. These ducts serve as intake and discharge duct respectively and also to receive therein the wires 22 and 23. To protect the connecting cord of Figs. 4 and 5 from a cut off of the flow of air therethrough a re-inforcement means in form of a coil spring 58 is embedded in hose 54 or disposed between two layers of the hose. As is obvious, this spring prevents effectively a flattening of the cord or a kink therein sufficiently narrow to close one or both of the ducts 56 and 57. Spring 58 may also be used as a grounding connection.

A spring according to Figs. 4 and 5 may of course also be used in connection with the designs of Figs. 2 and 3. Furthermore, partitions of the hose other than those shown here may be used and are within the basic concept of the invention. It is only essential for the invention that the connecting cord leads from the interior of the motor housing to inlet and outlet ports well spaced from the housing.

Figs. 7 and 8 show a modification of the plug for the connecting cord. While the plug of these figures is shown in connection with the cord design of Fig. 3 it will be apparent that it can also be employed in connection with any of the other cord designs and that, similarly, the plug of Fig. 6 is not limited to the cord design of Fig. 2.

Fig. 7 shows a two-pole plug the plug shell 60 of which is integral with the hose portion of the connecting cord. In contrast to the design of Fig. 6, the two ports 61 are formed within the plug shell proper, only the inlet port being shown. To further prevent the ingress of dust or other solid particles into the intake duct, port 61 is covered with a screen or filter 62 mounted within a sleeve 63 preferably molded into the material of the plug body. A similar screen may be used for the inlet port of Fig. 6. The aforesdescribed cord is easily replaceable.

Finally, Fig. 10 shows a design which is particularly suitable to join the connector to a single piece motor housing in sealing connection.

The connector itself is the same as has been described in connection with Fig. 9. Accordingly, the same reference numerals are used to designate corresponding parts. In contrast to the mounting and sealing of the connector as shown for the split housing of Fig. 1, base 33 is held within a threaded flange 70 which may be fixedly secured to or integral with motor housing 13. After the engaging connector member is applied to the receiving connector member, it is held in position by a locking nut 71. By tightening this nut coacting cones 40, 41 and 45, 46 are forced into sealing engagement.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent, is:

1. A connecting cord for an electric power unit including drive and fan means enclosed in a sealed housing, the said cord comprising a tubular member formed with two longitudinal ducts for a cooling medium, electric conductors disposed within said tubular member, and moisture and dust proof joining and sealing means on one end of said tubular member for joining and sealing the said end to the housing, said joining and sealing means including an engaging member and a receiving member, one of said members being secured to the housing and the other being secured to the respective end of said tubular member, and coacting contact elements supported on said members for connecting said electric conductors within the tubular member with said drive means, each of said members being formed with conduits therethrough for the cooling medium, the said members being engageable in sealing engagement with each other for effecting the communication between said ducts and the interior of said housing when said members are applied to each other, the said tubular member being formed with two outer opertures each leading into one of said ducts and situated spaced apart from said joining and sealing means, one of said ducts constituting an inlet and the other an outlet duct for circulating said cooling medium through said housing and said cord.

2. A connecting cord for an electric power unit including a motor and a motor driven fan enclosed in a sealed housing, the said cord comprising a flexible hose formed with at least two longitudinal ducts for a cooling medium, electric conductors disposed within said housing, moisture and dust proof joining and sealing means on one end of said hose for joining and sealing the said end to the housing, said joining and sealing means including an engaging member and a receiving member, one of said members being secured to the housing and the other being secured to the respective end of said tubular member, and coacting contact elements supported on said members for connecting said electric conductors within the tubular member with said drive means, each of said members being formed with conduits therethrough for the cooling medium, the said members being engageable in sealing engagement with each other for effecting communication between said ducts and the interior of said housing when said members are applied to each other, an electric connector member on the other end of the hose electrically connected with the conductors therein, the said hose being formed with two apertures through its outer wall, the said apertures being disposed in said connector member and each leading into one of said ducts, one of said ducts constituting an inlet duct and the other an outlet duct for circulating the cooling medium through said motor housing and said cord.

3. A connecting cord according to claim 2, wherein said connector member comprises a shell, the said apertures being extended through said shell into the ducts.

4. A connecting cord according to claim 3, wherein the said shell is integral with said hose.

5. A connecting cord according to claim 4, wherein flexible re-inforcement means are fitted in said hose to impede a compression and obturation of the ducts formed therein.

6. A connecting cord according to claim 5, wherein the said re-inforcement means comprise a coil spring embedded in the wall material of said hose and extending coaxially therewith.

7. A connecting cord according to claim 2, wherein screen means are fitted upon at least the aperture leading into the inlet duct.

8. A connecting cord according to claim 2, wherein the said hose includes crosswise disposed partition walls forming four longitudinal ducts therein, two opposite ones of said ducts constituting said inlet duct and said outlet duct respectively, the said electric conductors being disposed in the other two ducts.

9. A connecting cord according to claim 2, wherein the said hose includes partition walls forming said two longitudinal ducts therein constituting the inlet and outlet duct respectively, said electric conductors being embedded in the partition walls defining said ducts.

10. A connecting cord according to claim 1, wherein the sides of said members facing each other when the members are applied to each other, are formed with hollow protrusions and correspondingly shaped recesses respectively, the said conduits communicating with said protrusions and said recesses thereby forming flow channels through the engaging member and the receiving member.

11. A connecting cord according to claim 10, wherein the said protrusions are cone-shaped, the said recesses being correspondingly cone-shaped.

12. An electric power unit comprising a sealed housing, electric drive means and fan means rotatable by the fan means mounted within said housing, a flexible hose extending from said housing in sealed connection therewith, the said hose being formed with at least two longitudinal ducts therein communicating with the interior of the housing, one of said ducts constituting an inlet duct and the other an outlet duct for circulating a cooling medium through said housing, the said hose having two apertures through its outer wall, each of said apertures connecting one of said ducts with the atmosphere, the said apertures being spaced apart from the hose end sealed to the housing, the said fan means being arranged to suck air into the housing through one of said ducts and the respective aperture and to expel the sucked-in air through the other duct and the other aperture, and electric conductors disposed within said hose and connected to said drive means through said sealed connection.

13. An electric power unit according to claim 12, wherein an electric connector member is attached to the free end of said hose in electric connection with the conductors in the hose, the said apertures being disposed at the end of the hose having thereon said connector member.

14. An electric power unit according to claim 13, wherein the said connector member comprises a shell, the said apertures being extended through said shell into the ducts.

References Cited in the file of this patent

UNITED STATES PATENTS

| | | |
|---|---|---|
| 2,308,673 | Burgett | Jan. 19, 1943 |
| 2,371,193 | Sigmund | Mar. 13, 1945 |
| 2,548,614 | Peters | Apr. 10, 1951 |
| 2,691,691 | Wreford | Oct. 12, 1954 |

FOREIGN PATENTS

| | | |
|---|---|---|
| 28,325 | Netherlands | Nov. 15, 1932 |